United States Patent
King et al.

(10) Patent No.: US 8,843,984 B2
(45) Date of Patent: Sep. 23, 2014

(54) METHOD AND SYSTEM FOR PRESELECTING MULTIMEDIA CONTENT

(75) Inventors: Robert King, Roswell, GA (US); Darryl Cynthia Moore, Social Circle, GA (US); Linda A. Roberts, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 49 days.

(21) Appl. No.: 12/902,960

(22) Filed: Oct. 12, 2010

(65) Prior Publication Data

US 2012/0090008 A1    Apr. 12, 2012

(51) Int. Cl.
| | | |
|---|---|---|
| H04N 7/173 | (2011.01) | |
| H04N 21/2665 | (2011.01) | |
| H04N 21/231 | (2011.01) | |
| H04N 21/2668 | (2011.01) | |
| H04N 21/472 | (2011.01) | |

(52) U.S. Cl.
CPC ......... *H04N 21/472* (2013.01); *H04N 21/2665* (2013.01); *H04N 21/23106* (2013.01); *H04N 21/2668* (2013.01)
USPC ........................................................ 725/120

(58) Field of Classification Search
None
See application file for complete search history.

(56) References Cited

U.S. PATENT DOCUMENTS

| | | | |
|---|---|---|---|
| 6,172,677 B1 | 1/2001 | Stautner et al. | |
| 6,529,526 B1 | 3/2003 | Schneidewend | |
| 6,600,503 B2 | 7/2003 | Stautner et al. | |
| 7,216,290 B2 | 5/2007 | Goldstein et al. | |
| 7,278,092 B2 | 10/2007 | Krzanowski | |
| 7,360,166 B1 | 4/2008 | Krzanowski | |
| 7,418,672 B2 | 8/2008 | Stautner et al. | |
| 7,562,287 B1 | 7/2009 | Goldstein et al. | |
| 7,627,600 B2 | 12/2009 | Citron et al. | |
| 7,694,235 B2 | 4/2010 | Stautner et al. | |
| 7,930,712 B1 | 4/2011 | Joseph et al. | |
| 2001/0012020 A1 | 8/2001 | Stautner et al. | |
| 2003/0200336 A1 | 10/2003 | Pal et al. | |
| 2003/0221167 A1 | 11/2003 | Goldstein et al. | |
| 2004/0017388 A1 | 1/2004 | Stautner et al. | |
| 2005/0131992 A1 | 6/2005 | Goldstein et al. | |
| 2005/0246651 A1 | 11/2005 | Krzanowski | |
| 2005/0278737 A1 | 12/2005 | Ma et al. | |
| 2006/0209729 A1 | 9/2006 | Staniec et al. | |
| 2006/0253874 A1 * | 11/2006 | Stark et al. ...................... 725/62 |
| 2007/0027932 A1 | 2/2007 | Thibeault | |
| 2007/0294238 A1 | 12/2007 | Citron et al. | |
| 2008/0046099 A1 | 2/2008 | Belmont et al. | |
| 2008/0092157 A1 * | 4/2008 | Walter et al. .................... 725/25 |
| 2008/0114755 A1 | 5/2008 | Wolters et al. | |
| 2008/0155618 A1 | 6/2008 | Grady et al. | |

(Continued)

FOREIGN PATENT DOCUMENTS

EP   1499127 A1 *   1/2005   ............. H04N 7/173

*Primary Examiner* — Nathan Flynn
*Assistant Examiner* — Omar S Parra
(74) *Attorney, Agent, or Firm* — Jackson Walker L.L.P.

(57) ABSTRACT

A method and system for remote control at a client of a multimedia content distribution network (MCDN) enables a user to add desired multimedia program listings to a user collection. The user collection may be saved at an MCDN server for subsequent retrieval. Multimedia programs corresponding to the listings may be stored in a user collection cache. The user may easily select the listings in a user collection for presentation at an MCDN client. The multimedia programs may be provided from a plurality of content sources, including external content providers and the Internet.

20 Claims, 7 Drawing Sheets

(56) References Cited

U.S. PATENT DOCUMENTS

| | | |
|---|---|---|
| 2008/0184138 A1 | 7/2008 | Krzanowski et al. |
| 2009/0025033 A1 | 1/2009 | Stautner et al. |
| 2009/0158325 A1 | 6/2009 | Johnson |
| 2009/0235321 A1 | 9/2009 | Wu et al. |
| 2009/0298535 A1* | 12/2009 | Klein et al. ............ 455/556.1 |
| 2010/0049719 A1 | 2/2010 | Payne et al. |
| 2010/0064332 A1 | 3/2010 | Krikorian et al. |
| 2010/0070925 A1 | 3/2010 | Einaudi et al. |
| 2010/0076811 A1 | 3/2010 | Keller et al. |
| 2010/0138487 A1 | 6/2010 | Stautner et al. |
| 2010/0169414 A1 | 7/2010 | Pavot et al. |
| 2010/0192183 A1* | 7/2010 | Hu ................................. 725/62 |
| 2010/0225811 A1 | 9/2010 | Konvisser |
| 2010/0319040 A1 | 12/2010 | Diaz Perez |

\* cited by examiner

METHOD AND SYSTEM FOR PRESELECTING MULTIMEDIA CONTENT

BACKGROUND

1. Field of the Disclosure

The present disclosure relates to selecting multimedia content and, more particularly, to preselecting user collections of multimedia program listings.

2. Description of the Related Art

Subscribers to a multimedia content distribution network (MCDN) are typically provided with a user interface, including an electronic programming guide (EPG), for selecting multimedia content available for viewing. Operating the EPG may involve a series of operations to navigate the EPG and to select a program for immediate viewing. Users may often repeat cumbersome navigation operations when selecting programs with the EPG. Users may also desire to view multimedia content from various other sources, including from the Internet.

DESCRIPTION OF THE EMBODIMENT(S)

In one aspect, a disclosed method for preselecting multimedia content delivered over an MCDN includes displaying an indication of multimedia programs available via the MCDN, receiving first user input for selecting one of the available multimedia programs, adding a listing of the selected multimedia program to a user collection of multimedia program listings, and displaying an indication of the user collection. The available multimedia programs may include multimedia programs from a plurality of multimedia content sources. The indication of available multimedia programs may include an EPG provided by the MCDN. The plurality of multimedia content sources may include a video-on-demand (VOD) program, a prerecorded program, a pay-per-view (PPV) program, streaming Internet content, a scheduled program, a program broadcast in real time, or a combination thereof. The first user input may be received at a remote control device, while the indication of the user collection may be displayed on the remote control device.

In certain embodiments, the method may further include receiving second user input for selecting a multimedia program listing in the user collection, and initiating playback of a multimedia program corresponding to the selected multimedia program listing. The method may further include causing the selected multimedia program to be recorded and stored in a user collection cache (UCC) for subsequent playback from the UCC. The method may also include receiving third user input for naming the user collection, and causing the user collection to be stored based on the third user input, including causing the multimedia program listings included in the user collection to be stored. The method may still further include receiving fourth user input for selecting a named user collection, and displaying an indication of the named user collection.

In a further aspect, a disclosed wireless user device in communication with an MHD for preselecting multimedia content provided via an MCDN includes a processor coupled to memory media, and a wireless interface coupled to the processor. The memory media may include processor executable instructions to display, using a display accessible to the processor, an indication of available multimedia programs from a plurality of multimedia content sources and accessible via the MCDN, receive first user input to add an available multimedia program listing to a user collection of multimedia program listings, and display, using the display, the user collection. The processor executable instructions may further be executable to receive second user input to select a current multimedia program listing from the displayed user collection for output by the MHD.

In particular embodiments, the memory media may further include processor executable instructions to send a message to the MHD to output a multimedia program corresponding to the second user input. The plurality of multimedia content sources may include at least one of: an EPG provided by the MCDN, a VOD program, a prerecorded program, a PPV program, streaming Internet content, a scheduled program, and a program broadcast in real time. The memory media may further include processor executable instructions to store a multimedia program corresponding to the first user input in a UCC for subsequent playback from the UCC. The UCC may be a digital video recorder (DVR) associated with the MHD. The memory media may further include processor executable instructions to cause the user collection, including the multimedia program listings, to be stored on an MCDN server.

In particular embodiments, the memory media may include processor executable instructions to receive third user input for selecting a stored user collection from an MCDN server, retrieve the selected user collection from the MCDN server, and display, using the display, an indication of the retrieved user collection.

In yet another aspect, a disclosed computer-readable memory media includes executable instructions for preselecting multimedia content from a plurality of multimedia content sources for display at a client of an MCDN. The instructions may be executable to receive first user input to add an available multimedia program listing to a user collection of multimedia program listings, display, on a display, the user collection, receive second user input to select a multimedia program listing from the displayed user collection for output by the MCDN client, and send a command to the MCDN client to output a multimedia program corresponding to the selected multimedia program listing. The plurality of multimedia content sources may include at least one of: an EPG provided by the MCDN, a VOD program, a prerecorded program, a PPV program, streaming Internet content, a scheduled program, and a program broadcast in real time.

In some embodiments, the memory media may further include instructions executable to display, on the display, an indication of available multimedia programs accessible via the MCDN, while at least a portion of the displayed indication may be selected to provide the first user input. The memory media may further include instructions executable to cause the user collection, including the multimedia program listings, to be stored on an MCDN server. The memory media may still further include instructions executable to receive third user input for selecting a stored user collection from an MCDN server, retrieve the selected user collection from the MCDN server, and display, on the display, the retrieved user collection. The memory media may still further include instructions executable to cause a plurality of multimedia programs corresponding to the retrieved user collection to be output at the MCDN client in a predetermined sequence determined by sequence information included in the user collection.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
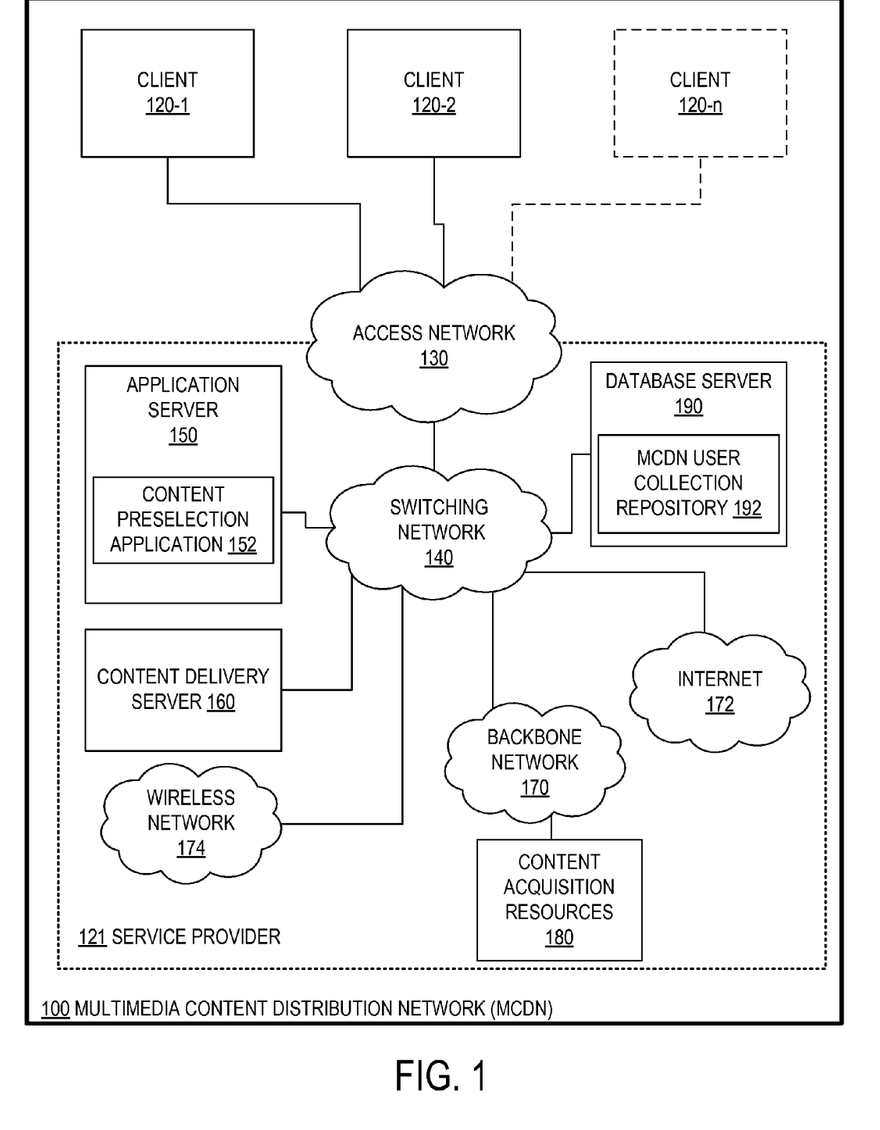
FIG. 1 is a block diagram of selected elements of an embodiment of an MCDN.

Turning now to the drawings, FIG. 1 is a block diagram illustrating selected elements of an embodiment of MCDN 100, including content preselection application 152 and MCDN user collection repository 192, which may be used for preselecting content provided to users of MCDN 100, as will be described in detail herein. Although multimedia content is not limited to TV, VOD, or PPV programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital connections between clients 120 and a node (see also FIG. 4) in access network 130 while fiber, cable or another broadband medium connects service provider resources to the node. In other embodiments, the broadband cable may extend all the way to clients 120. In certain embodiments, fiber optic cables may be provided from the node in access network 130 to each individual client 120. The connections between access network 130 and clients 120 may include digital subscriber line (DSL) connections. In particular embodiments, the connections may be DSL-compliant twisted pair or another type of galvanic loop (see also FIG. 4).

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL-compliant connections, switching network 140 and/or access network 130 may include elements of a DSL access multiplexer (DSLAM) that multiplexes many subscriber DSLs to backbone network 170 (see also FIG. 4).

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an EPG, such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, DVR services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include various applications (not shown in FIG. 1) that may provide functionality to clients 120.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote control devices, identifiers for peripheral devices, etc.

Also shown in FIG. 1 is wireless network 174, which may be coupled to switching network 140. Wireless network 174 may represent a wireless communications network for providing wireless service to a plurality of wireless user devices (not shown in FIG. 1). Wireless network 174 may accordingly represent an external network that is configured to operate autonomously to MCDN 100, but which may be coupled to MCDN 100. In certain embodiments, service provider 121 may own and/or operate both MCDN 100 and wireless network 174. It is further noted that wireless network 174 may be accessible at a premises of client 120, as will be described in additional detail herein.

In FIG. 1, Internet 172 is representative of any public network accessible via switching network 130. Access to Internet 172 may encompass publication of websites, web pages, and web applications that may be invoked using a universal resource locator (URL), such as an Internet web address. A web browser or similar application may be used to access a published website using an Internet user device (not shown in FIG. 1). In certain implementations, application server 150 and/or database server 190 may be configured to host web servers (not shown in FIG. 1) accessible via Internet 172, whereby the web servers provide functionality for publishing websites and managing various URLs related thereto. It is noted that websites published using MCDN 100 may provide controlled access based on an MCDN client account associated with individual client 120. Client-specific websites may thus enable client-specific information and/or communication channels to be made available by MCDN 100 via Internet 172. It is further noted that wireless network 174 may provide access to Internet 172, either independently or via switching network 140, in various embodiments.

Also shown in FIG. 1 is content preselection application 152, which, in certain embodiments, may provide functionality to enable client 120 to preselect certain MCDN programs, as will be explained in further detail herein. It is noted that content preselection application 152 may represent a service provided by application server 150 to users of MCDN 100. Content preselection application 152 may accordingly provide application services to a user device, such as a wireless user device serviced by wireless network 174, and/or a device associated with MCDN client 120. Furthermore, database server 190 is shown in FIG. 1 including MCDN user collection repository 192, which may be used to store and retrieve user collections of multimedia program listings. As used herein, a "user collection" refers to a listing of multimedia programs, such as MCDN programs or Internet content, that has been aggregated by a user for the purpose of selection, display and output at MCDN client 120. A user collection may be used to generate a preselected list of multimedia programs from which the user may select with greater ease than selecting from a greater number of available programs. A user collection may also be used to create a play list of multimedia programs, which may be output at MCDN client 120 in a predetermined sequence. A multimedia program listing in a user collection may include information usable by MCDN client 120 to locate, obtain, and/or output a multimedia program associated with the multimedia program listing.

Figure 2:
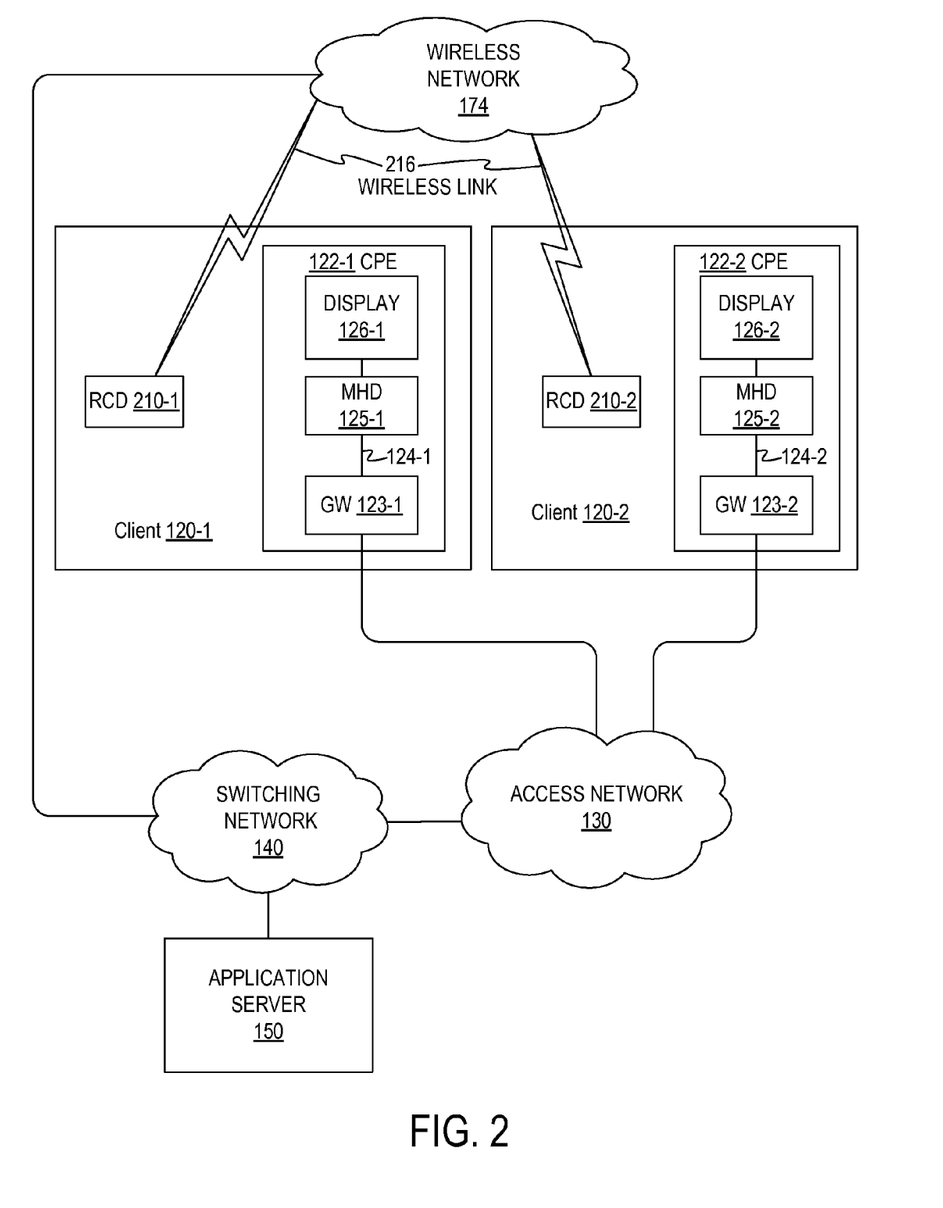
FIG. 2 is a block diagram of selected elements of an embodiment of an MCDN showing additional detail for the MCDN clients.

Turning now to FIG. 2, clients 120 are shown in additional detail with respect to access network 130. Clients 120 may include network appliances collectively referred to herein as customer premises equipment (CPE) 122. In the depicted embodiment, CPE 122 includes the following devices: gateway (GW) 123, MHD 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device. It is noted that FIG. 2, as shown, includes remote control device (RCD) 210, application server 150, and MHD 125, which, as discussed below, may implement preselection of content provided by MCDN 100, including content from external sources, such as Internet 172 (see FIG. 1). MHD 125 may further be configured to output preselected content according to the methods described herein.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard for computer monitors and/or television displays. Standards for computer monitors include analog standards such as video graphics array (VGA), extended graphics array (XGA), etc., or digital standards such as digital visual interface (DVI) and high definition multimedia interface (HDMI), among others. A television display may comply with standards such as National Television System Committee (NTSC), Phase Alternating Line (PAL), or another suitable standard. Display 126 may include one or more integrated speakers to play audio content.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet-switched embodiments of access network 130 or modulated for delivery over cable-based access networks. In some embodiments, MHD 125 may be implemented as a stand-alone set top box suitable for use in a co-axial or IP-based MCDN.

MHD 125 may be operable to communicate requests or commands wirelessly to a dedicated remote control (not shown in FIG. 2), which may employ infrared (IR) or radio frequency (RF) signals. It is noted that MHDs 125 may also receive requests or commands via buttons (not depicted) located on side panels of MHDs 125. For example, local transceiver 308 (see FIG. 3) may provide a direct communication link between MHD 125 and the dedicated remote control.

Clients 120 may further be configured to operate with RCD 210, which is configured to control the operation of MHD 125 by means of a user interface displayed on RCD 210. As will be described in detail below, RCD 210 may be a wireless device, such as a mobile telephone, that is capable of executing instructions that generate the user interface displayed on RCD 210 and receive user input for remote control of MHD 125. In one embodiment, wireless network 174 may provide wireless network service to RCD 210 via wireless link 216. As shown in FIG. 2, wireless network 174 may be a wide-area network (WAN) that is capable of providing service to a number of clients 120, such as client 120-1 and client 120-2, which may be at different locations. Wireless network 174, in the exemplary embodiment depicted in FIG. 2, may be coupled to switching network 140 and access network 130, through which control over MHD 125 may be executed via GW 123.

Also shown in FIG. 2 is application server 150, which may be accessed via switching network 140, and which may provide various services to enable RCD 210 to perform remote control of MHD 125. For example, application server 150 may provide executable instructions, in the form of application code (not shown in FIG. 2) for execution by RCD 210. The application code may enable RCD 210 to generate a user interface and to receive user input for providing remote control functionality. The application code may further be configured to communicate with application server 150, in response to receiving user input. In certain embodiments, content preselection application 152 executing on application server 150 may enable a user to select and store user collections of multimedia program listings, using RCD 210 and/or MHD 125. It is noted that application server 150 may also communicate with a third-party server, such as associated with wireless network 174 and/or with RCD 210. In certain embodiments, application server 150 may be configured to support various different wireless applications associated with MCDN 100.

Figure 3:
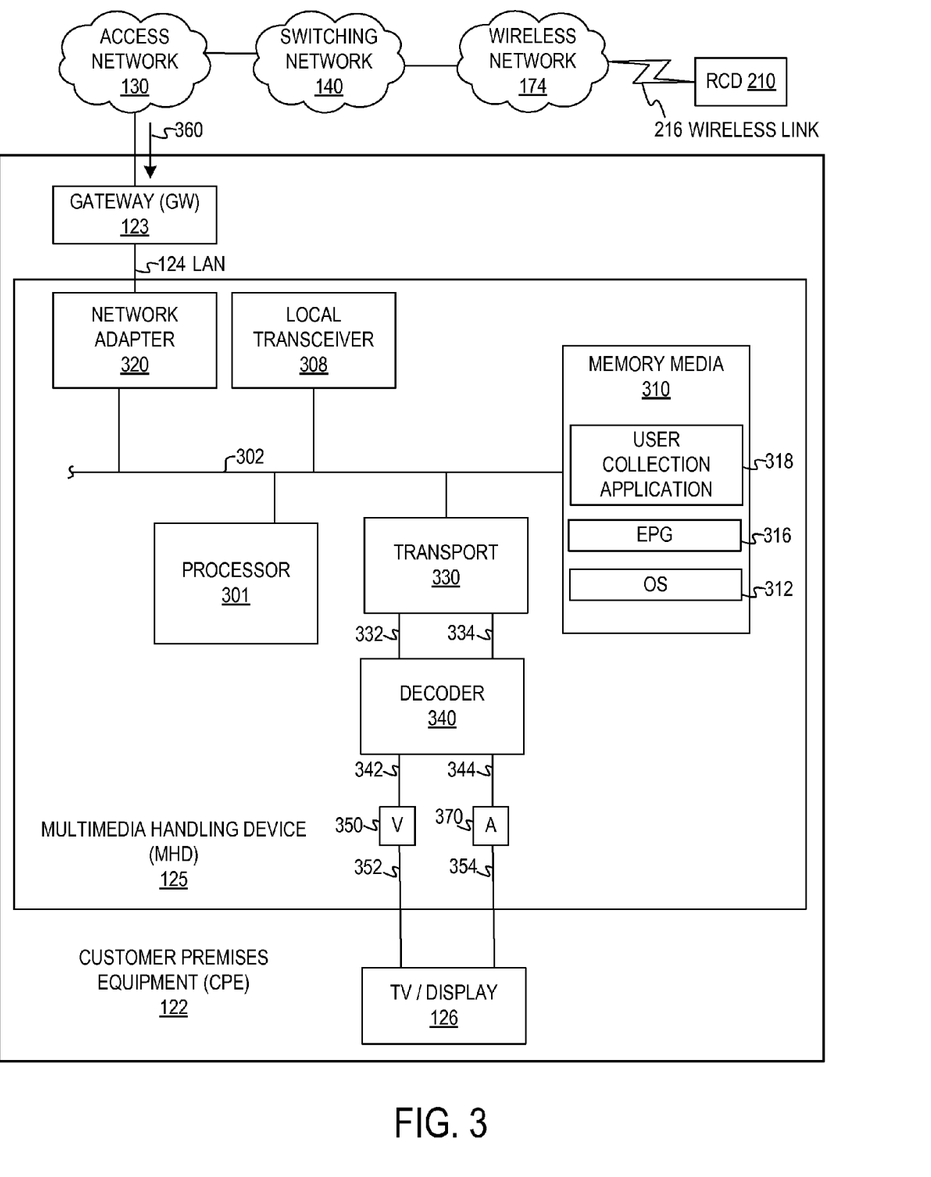
FIG. 3 is a block diagram of selected elements of an embodiment of a multimedia handling device (MHD)

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media, collectively identified as memory media 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130. Also shown is RCD 210, which may access GW 123 via wireless network 174 and switching network 140, as similarly described above with respect to FIG. 2. RCD 210 is shown accessing wireless network 174 via wireless link 216.

In embodiments suitable for use in IP-based content delivery networks, MHD 125, as depicted in FIG. 3, may include transport unit 330 that assembles the payloads from a sequence or set of network packets into a stream of multimedia content. In coaxial-based access networks, content may be delivered as a stream that is not packet-based and it may not be necessary in these embodiments to include transport unit 330. In a co-axial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125.

Memory media 310 encompasses persistent and volatile media, fixed and removable media, and magnetic and semiconductor media. Memory media 310 is operable to store instructions, data, or both. Memory media 310 as shown may include sets or sequences of instructions and/or data, namely, an operating system 312, EPG 316, and user collection application 318. Operating system 312 may be a UNIX or UNIX-like operating system, a Windows® family operating system, or another suitable operating system. In some embodiments, memory media 310 is configured to store and execute instructions provided as services to client 120 by application server 150, as mentioned previously.

EPG 316 represents a guide to the multimedia content provided to client 120 via MCDN 100, and may be shown to the user as an element of an MHD user interface on display 126. The MHD user interface may include a plurality of menu items arranged according to one or more menu layouts, which enable a user to operate MHD 125. The user may operate the MHD user interface, including EPG 316, using RCD 210 (see FIG. 2), which, as noted above, may be configured to provide a unique remote control interface. User collection application 318 may represent functionality configured to enable a user to select multimedia program listings and store selected listings into a user collection. The multimedia program listings may represent multimedia programs that are accessible via a plurality of multimedia content sources, including, but not limited to: a VOD program, a prerecorded program, a PPV program, streaming Internet content, a scheduled program, and a program broadcast in real time. User collection application 318 may further provide functionality to retrieve previously stored user collections, for example, from MCDN user collection repository 192 (see FIG. 1). It is noted that in certain embodiments, user collection application 318 may operate in conjunction with content preselection application 152 executing on application server 150 (see FIG. 1). It is further noted that in other embodiments, user collection application 318 may be omitted from memory media 310, while remote control application 402 (see FIG. 4) executes user collection functionality on RCD 210. In still other embodiments, user collection application 318 may operate in conjunction with remote control application 402 (see FIG. 4) on RCD 210 to facilitate management of user collections and presentation of multimedia programs on MHD 125 corresponding to multimedia program listings in a user collection.

Local transceiver 308 represents an interface of MHD 125 for communicating with external devices, such as a dedicated remote control (not shown in FIG. 3). Local transceiver 308 may provide a mechanical interface for coupling to an external device, such as a plug, socket, or other proximal adapter. In some cases, local transceiver 308 is a wireless transceiver, configured to send and receive IR or RF or other signals. In some implementations local transceiver 308 receives IR or RF signals, but does not transmit IR or RF signals, i.e., local transceiver 308 may be a receiver. Local transceiver 308 may be accessed by a remote control module (not shown in FIG. 3) for providing remote control functionality. In some embodiments, local transceiver 308 may include WiFi functionality.

Figure 4:
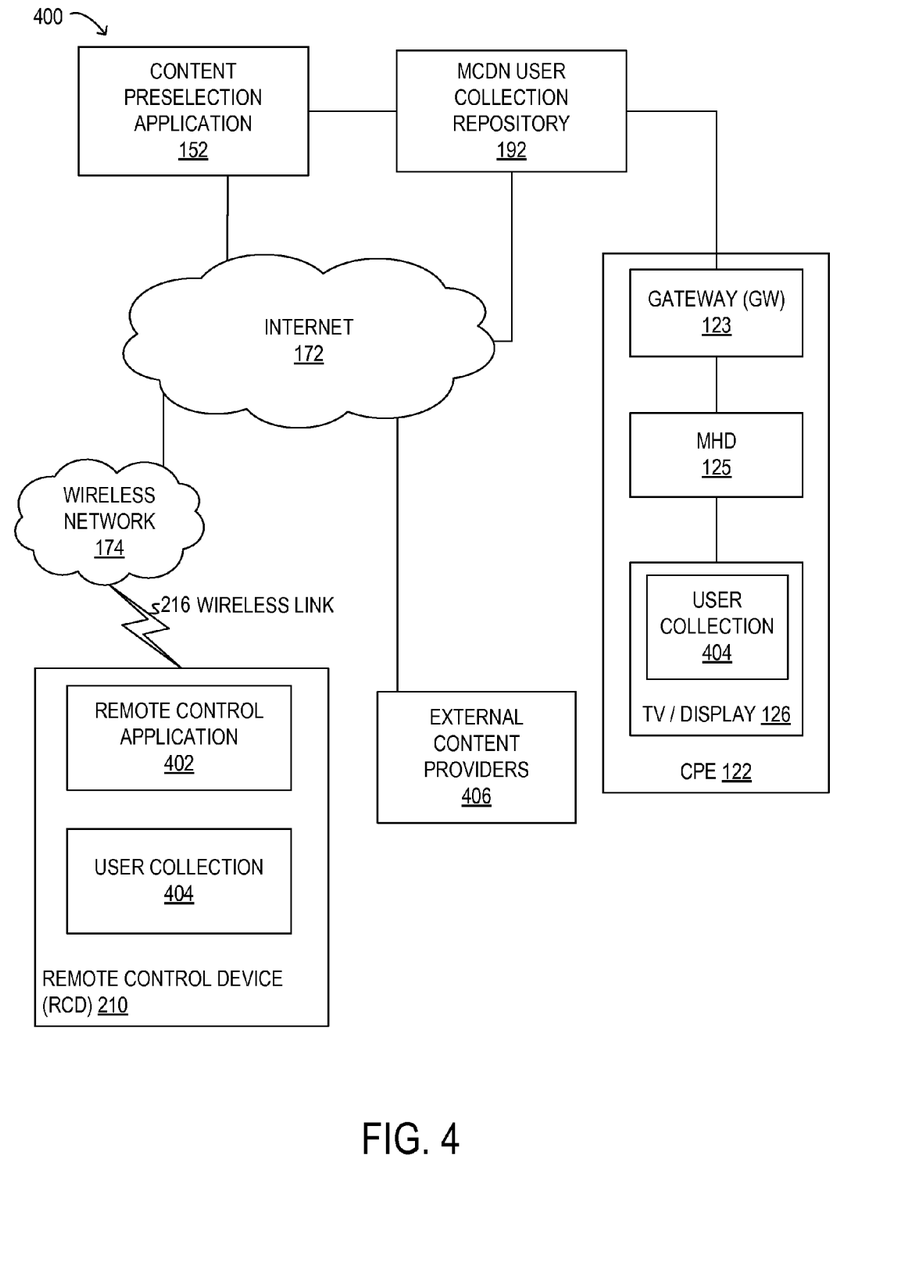
FIG. 4 is a block diagram of selected elements of an embodiment of a remote control system.

Turning now to FIG. 4, a block diagram of selected elements of an embodiment of remote control system 400 is depicted. It is noted that elements in FIG. 4 represent like-numbered elements discussed above with respect to FIGS. 1-3. Remote control system 400 may employ an exemplary architecture for remote control in conjunction with MCDN 100 (see FIG. 1), as described herein. In various embodiments, certain elements in remote control system 400 may be omitted or rearranged, as desired.

In FIG. 4, remote control system 400 is shown including display 126, MHD 125, and GW 123, which may represent certain elements of CPE 122 that are configured for use with MCDN 100 (see FIGS. 1-3). GW 123 is shown in communication with MCDN user collection repository 192 and content preselection application 152, which may represent one or more MCDN servers (see also FIGS. 1-3) that are configured to serve a large number of clients 120 and their respective users. Thus, while MCDN elements are shown in FIG. 4 singularly coupled to GW 123, it will be understood that such connections may be representative for multiple simultaneous connections to different GWs 123 at respectively different locations of clients 120.

As shown in FIG. 4, content preselection application 152 and MCDN user collection repository 192 are accessible via Internet 172, which may serve as a gateway to wireless network 174 and/or external content providers 406. External content providers 406 may represent content available from third-parties or publically available, such as Internet content. As depicted in the exemplary embodiment of remote control system 400, RCD 210 may thus access content preselection application 152 and MCDN user collection repository 192, as well as CPE 122, via an Internet connection provided through wireless network 174. In other examples of remote control system 400 (not shown in FIG. 4), RCD 210, via wireless network 174, may be configured for direct MCDN access to content preselection application 152 and/or CPE 122.

As noted above, wireless network 174 may include additional servers (not shown in FIG. 4) for wireless application functionality, such as supporting remote control application 402 executing on RCD 210. Accordingly, in certain embodiments, content preselection application 152 may be configured to communicate with wireless network 174 via a server (not shown in FIG. 4) associated with wireless network 174 and/or RCD 210.

Also in FIG. 4, wireless network 174 and Internet 172 may represent elements of MCDN 100, as discussed previously (see also FIG. 1). Wireless network 174 may provide wireless service via wireless link 216 to RCD 210, which may represent a mobile telephony device, such as a cellular telephone, smart phone, or other types of devices, such as media players, music players, or network access devices. RCD 210 may also be a portable computer or a personal computer configured with wireless capability (see also FIG. 7). RCD 210 is shown including functional elements, which may represent instructions or code executable by RCD 210. Remote control application 402 may provide a user interface with unique and novel functionality, as will be described in detail below (see also FIG. 7). Remote control application 402 may further be configured to communicate via wireless network 174 to establish a connection with MHD 125, send commands to MHD 125 over the established connection, and receive feedback and information from MHD 125.

As noted previously, remote control application 402 may include certain functionality to enable creation, management, retrieval and operation of user collections, as described herein. In one exemplary embodiment, remote control application 402 may enable a user (not shown in FIG. 4) to select multimedia program listings from EPG 316 displayed on display 126. In certain embodiments, certain portions of EPG 316 may be transmitted to RCD 210 for display and navigation, and selection of multimedia program listings. The user may add desired multimedia program listings to user collection 404, which, as shown in FIG. 4, may be displayed on RCD 210 and/or display 126. User collection 404 may be stored to and retrieved from MCDN user collection repository 192, from where it may be centrally accessed by various MCDN resources.

In operation of remote control system 400, a user (not shown in FIG. 4) of client 120 may operate RCD 210 to display available multimedia content, for example, by navigating EPG 316 or browsing content made available by external content providers 406. The available multimedia content may be displayed on RCD 210 and/or display 126. The user may preselect desired multimedia program listings by adding them to a user collection. The user collection may be named and saved for later retrieval by the user. In certain instances, multimedia programs referenced in a user collection may be cached or prerecorded for later retrieval and presentation. Such a cache may be referred to as a UCC. For example, a multimedia program referenced in a user collection may be recorded by DVR functionality provided by the MCDN, which may serve as the UCC. It is noted that a multimedia program may be cached at an MCDN server, such as database server 190, or at client 120. The user may then select a desired listing in the currently displayed user collection for presentation by MHD 125. The multimedia program corresponding to the desired listing may then be output by MHD 125. If the multimedia program was cached, MHD 125 may retrieve the multimedia program from the cache. Depending on the configuration of RCD 210, the user may perform the actions described above using RCD 210 for both display and selection. In certain embodiments, RCD 210 (or a dedicated remote control) may be used in conjunction with MHD 125 for display and selection.

Figure 5:
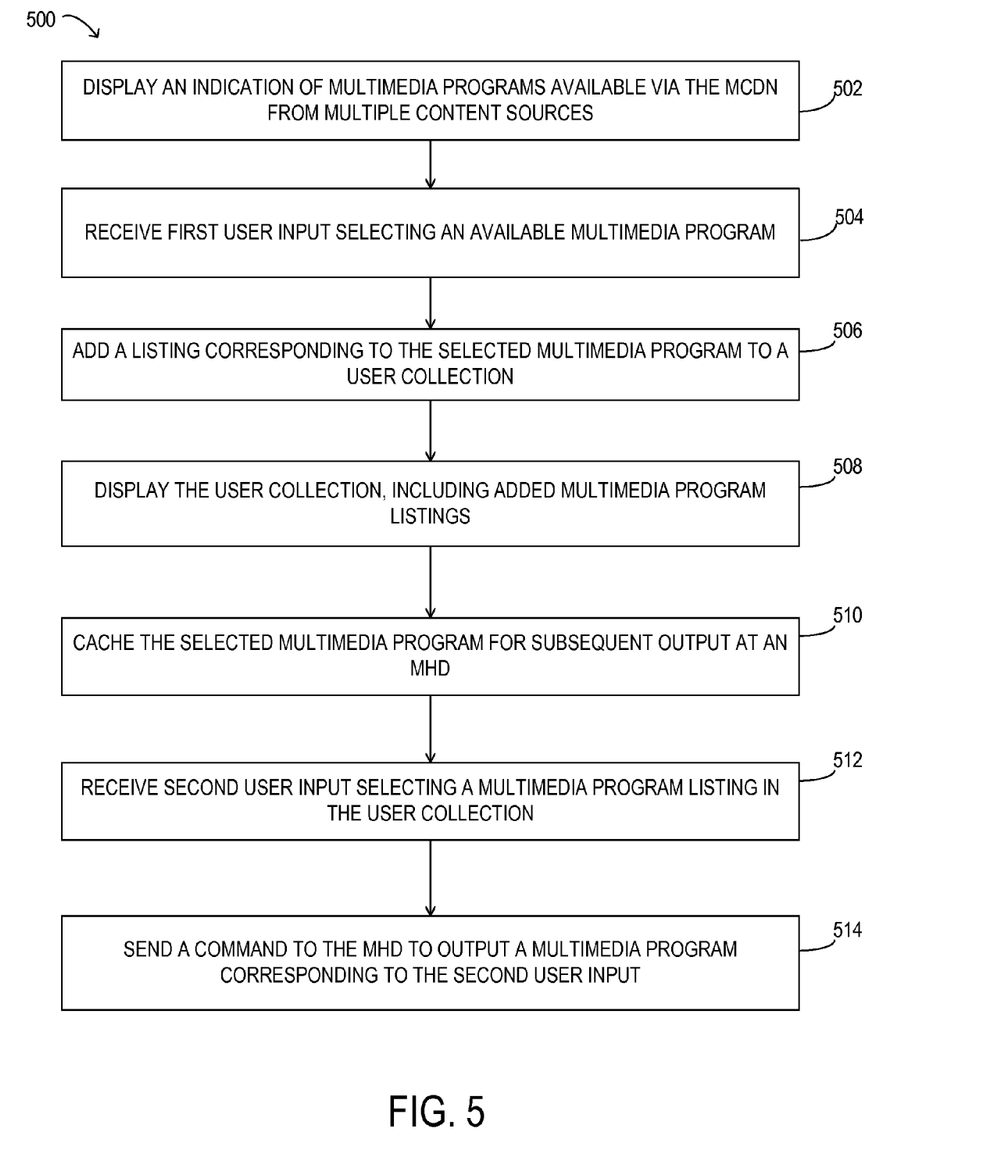
FIG. 5 illustrates selected elements of an embodiment of an interactive remote control method.

Turning now to FIG. 5, selected elements of an embodiment of a method 500 for remote control are illustrated. In one embodiment, method 500 may be performed by remote control application 402 (see FIG. 4) in conjunction with MCDN 100 and remote control system 400 (see FIGS. 1-4). Method 500 may also involve functionality provided by (or facilitated by) content preselection application 152 (see FIGS. 1-2 and 4). It is noted that certain operations described in method 500 may be optional or may be rearranged in different embodiments.

In method 500, an indication of multimedia programs available via the MCDN from multiple content sources may be displayed (operation 502). The indication may be displayed on RCD 210 and/or on display 126 of MHD 125. The indication may be displayed within an EPG provided by the MCDN. First user input for selecting an available multimedia program may be received (operation 504). The first user input may be received at RCD 210. The first user input may also be received at MHD 125 via RCD 210 or another dedicated remote control device. The first user input may be based on the indication displayed in operation 502, such that an available multimedia program is selected from the displayed indication. A listing corresponding to the selected multimedia program may be added (operation 506) to a user collection. The user collection, including the added multimedia program listings, may be displayed (operation 508). The user collection may be displayed on RCD 210 and/or display 126. The user collection may be displayed in the form of a list of multimedia program listings. The selected multimedia program may be cached (operation 510) for subsequent output at an MHD. The cached multimedia program may be retrieved from the cache by MHD 125 and output on display 126. Second user input selecting a multimedia program listing in the user collection may be received (operation 512). A command may be sent (operation 514) to the MHD to output a multimedia program corresponding to the second user input. The multimedia program listing may be associated with, and/or may include, information usable by the MHD to identify and obtain the multimedia program. Such information may be, for example, a network address associated with the multimedia program. In certain embodiments, the second user input may globally specify an entire user selection in operation 512, such that operation 514 may be repeated for a number of multimedia programs in a predetermined sequence, corresponding to the contents of the specified user collection.

Figure 6:
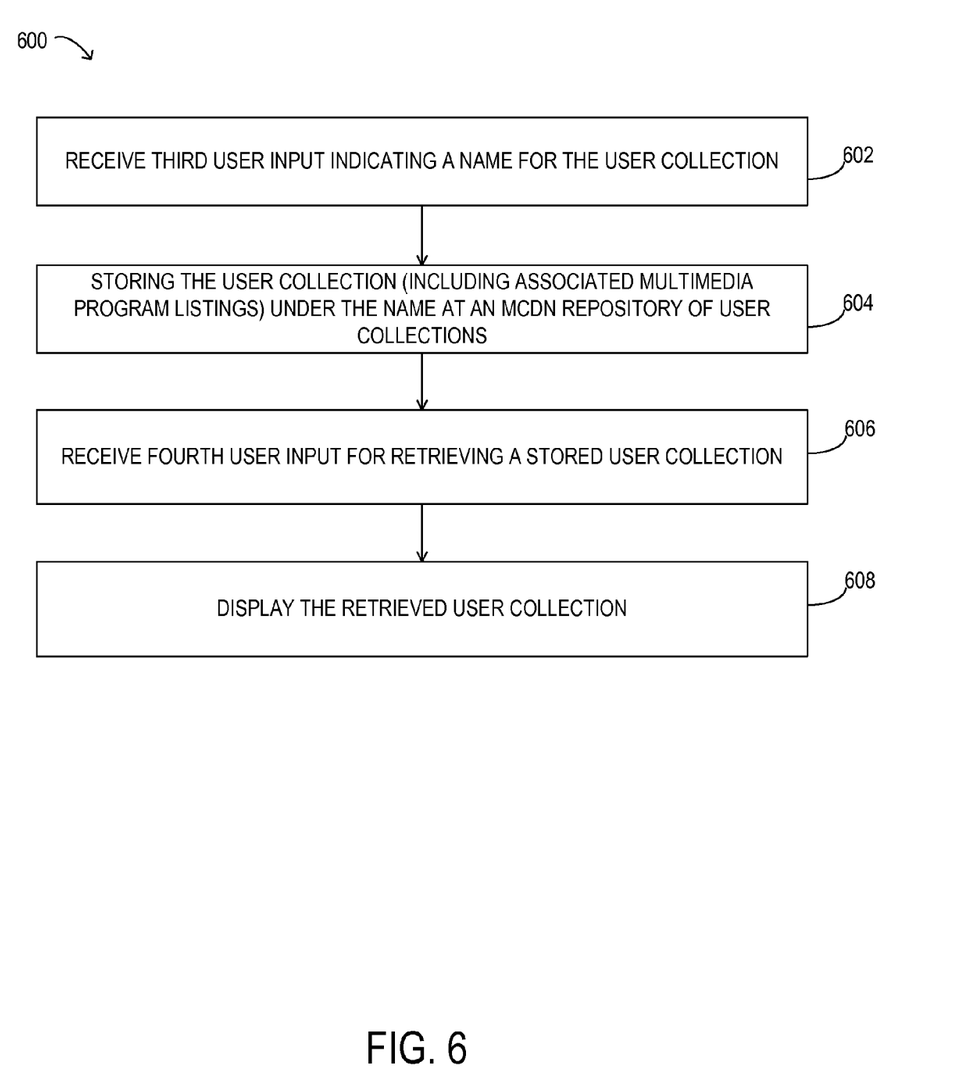
FIG. 6 illustrates selected elements of an embodiment of an interactive remote control method.

Turning now to FIG. 6, selected elements of an embodiment of method 600 for remote control are illustrated in flow chart form. In one embodiment, method 600 may be performed by remote control application 402 (see FIG. 4) in conjunction with MCDN 100 and remote control system 400 (see FIGS. 1-4). Method 600 may also involve functionality provided by (or facilitated by) content preselection application 152 (see FIGS. 1-2 and 4). It is noted that certain operations described in method 600 may be optional or may be rearranged in different embodiments.

In the depicted embodiment, method 600 receives (operation 602) third user input indicating a name for the user collection. The third user input may be received at RCD 210 and/or at MHD 125. The user collection, including associated multimedia program listings, may be stored (operation 604) under the name at an MCDN repository of user collections. Fourth user input for retrieving a stored user collection may be received (operation 606). The fourth user input may be used to retrieve the stored user collection. The retrieved user collection may be displayed (operation 608). The user may then select multimedia program listings in the retrieved user collection, as described above with respect to method 500 (see FIG. 5).

Figure 7:
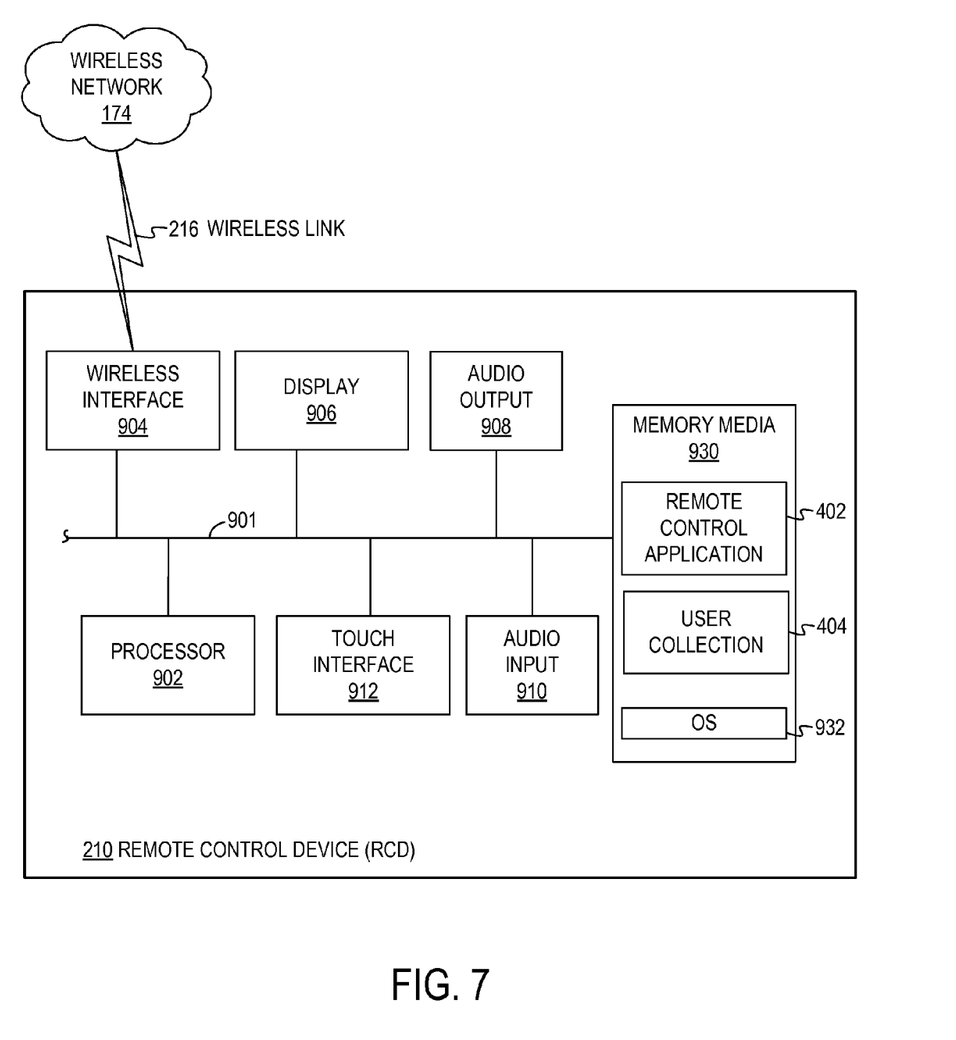
FIG. 7 is a block diagram of selected elements of an embodiment of a remote control device.

Referring now to FIG. 7, a block diagram illustrating selected elements of an embodiment of RCD 210 is presented. As noted above, RCD 210 may represent a mobile user device with wireless communication capability. The elements of RCD 210 depicted in FIG. 7 may be physically implemented as a single, self-contained device that is portable and operable by hand by a user. As shown in FIG. 7, RCD 210 may operate in conjunction with MHD 125 (see also FIGS. 1-4) to execute the methods and operations described herein.

In the embodiment depicted in FIG. 7, RCD 210 includes a processor 902 coupled via shared bus 901 to storage media collectively identified as memory media 930. RCD 210, as depicted in FIG. 7, further includes wireless interface 904 that interfaces RCD 210 to wireless network 174 via wireless link 216, and through which RCD 210 may communicate with other elements of MCDN 100 (see FIGS. 1-4). Also shown coupled to shared bus 901 are display 906, audio output 908, audio input 910, and touch interface 912. As described herein, RCD 210 may be configured to execute remote control functionality for controlling MHD 125.

Display 906 may be implemented as a TV, a liquid crystal display screen, a computer monitor, or the like. Display 906 may comply with a display standard for computer monitors and/or television displays. Standards for computer monitors include analog standards such as VGA, XGA, etc., or digital standards such as DVI, HDMI, among others. A television display may comply with standards such as NTSC, PAL, or another suitable standard. Touch interface 912 may be co-mounted in an aligned manner with display 906, such that displayed elements, such as control elements (not shown in FIG. 7), may be selected and/or operated using touch input by the user.

Audio output 908 may represent one or more speakers to play audio content and may, in certain instances, represent an electrical output connector for connection to an external audio device. In this manner, audio output 908 may be configured to attain certain audio effects or a desired audio quality. Similarly, audio input 910 may represent a microphone or audio transducer for capturing audio input, including speech, provided by users of RCD 210.

Memory media 930 encompasses persistent and volatile storage media, fixed and removable storage media, and magnetic and semiconductor storage media. Memory media 930 is operable to store instructions, data, or both. Memory media 930 as shown may include sets or sequences of instructions, including an operating system 932, remote control application 402, and user collections 404 (see also FIG. 4). Operating system 932 may be a UNIX or UNIX-like operating system, a Windows® family operating system, a mobile device operating system, an embedded operating system, or another suitable operating system. It is noted that remote control application 402 may execute certain methods and operations described herein, such as portions of method 500 (see FIG. 5), method 600 (see FIG. 6), and/or other operations. It is further noted that control elements (not shown in FIG. 7) may represent virtual controls, such as buttons, knobs, sliders, etc., that may be operated by users of RCD 210. In particular embodiments, the control elements may include virtual control elements displayed by display 906 and operable using touch interface 912, which may include a touch sensor, a touch screen, and/or other tactile sensor. Accordingly, the control elements may represent static as well as dynamic controls that may be reconfigured for various input and output functions, as desired. For example, one control element may display user collection 404, as well as enable adding and selecting multimedia program listings of user collection 404.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method, comprising:
    establishing a bidirectional communication connection between a remote control device and a set top box wherein the bidirectional communication connection enables the remote control device to send commands to the set top box via the communication connection and receive information from the set top box via the communication connection and further wherein the bidirectional communication connection includes a wireless service link between a mobile telephone device serving as the remote control device and a wireless network, a connection between the wireless network and a switching network, and a connection between the switching network and an access network coupled to the set top box;
    generating a display of multimedia programs available via a multimedia content distribution network, wherein the multimedia programs available include multimedia programs from a plurality of multimedia content sources;
    receiving first user input indicating a selected multimedia program from the multimedia programs available;
    adding a listing corresponding to the selected multimedia program to a user collection of multimedia program listings; and
    displaying an indication of the user collection.

2. The method of claim 1, wherein the display of multimedia programs available includes an electronic programming guide, and wherein the plurality of multimedia content sources includes at least one of: a video-on-demand program, a prerecorded program, a pay-per-view program, streaming Internet content, a scheduled program, and a program broadcast in real time.

3. The method of claim 1, wherein the first user input is received at a remote control device, and wherein the indication of the user collection is displayed on the remote control device.

4. The method of claim 1, further comprising:
    receiving second user input for selecting a multimedia program listing in the user collection; and
    initiating playback of a multimedia program corresponding to the selected multimedia program listing.

5. The method of claim 1, further comprising:
    causing the selected multimedia program to be recorded and stored in a user collection cache for subsequent playback from the user collection cache.

6. The method of claim 1, further comprising:
    receiving third user input for naming the user collection; and
    causing the user collection to be stored based on the third user input, including causing the multimedia program listings included in the user collection to be stored.

7. The method of claim 6, further comprising:
    receiving fourth user input for selecting a named user collection; and
    displaying an indication of the named user collection.

8. A wireless user device in communication with a multimedia handling device for preselecting multimedia content provided via a multimedia content distribution network, the wireless user device comprising:
    a processor coupled to memory media;
    a wireless interface coupled to the processor; and
    wherein the memory media include processor executable instructions which, when executed by the processor, cause the processor to perform operations, comprising:
    establishing a bidirectional communication connection between a remote control device and a set top box wherein the bidirectional communication connection enables the remote control device to send commands to the set top box via the communication connection and receive information from the set top box via the communication connection and further wherein the bidirectional communication connection includes a wireless link between the remote control device and a wireless network, a connection between the wireless network and a switching network, and a connection between the switching network and an access network;
    displaying, using a display accessible to the processor, an indication of available multimedia programs from a plurality of multimedia content sources;
    receiving first user input to add an available multimedia program listing to a user collection of multimedia program listings;
    displaying, using the display accessible to the processor, the user collection, wherein the added multimedia program is listed; and
    receiving second user input to select a current multimedia program listing from the displayed user collection for output by the multimedia handling device.

9. The wireless user device of claim 8, wherein the operations include:
    sending a message to the multimedia handling device to output a multimedia program corresponding to the second user input.

10. The wireless user device of claim 8, wherein the plurality of multimedia content sources includes at least one of: an electronic programming guide provided by the network, a video-on-demand program, a prerecorded program, a pay-per-view program, streaming Internet content, a scheduled program, and a program broadcast in real time.

11. The wireless user device of claim 8, wherein the operations include:
    storing a multimedia program corresponding to the first user input in a user collection cache for subsequent playback from the user collection cache.

12. The wireless user device of claim 11, wherein the user collection cache is a digital video recorder associated with the multimedia handling device.

13. The wireless user device of claim 8, wherein the operations include:

causing the user collection, including the multimedia program listings, to be stored on a multimedia content distribution network server.

14. The wireless user device of claim 13, wherein the operations include:

receiving third user input for selecting a stored user collection from a network server;

retrieving the selected user collection from the network server; and displaying, using the display, an indication of the retrieved user collection.

15. A non-transitory computer-readable medium including processor executable instructions, which when executed by a processor, cause the processor to perform operations comprising:

establishing a bidirectional communication connection between a remote control device and a set top box wherein the bidirectional communication connection enables the remote control device to send commands to the set top box via the communication connection and receive information from the set top box via the communication connection and further wherein the bidirectional communication connection includes a wireless link between the remote control device and a wireless network, a connection between the wireless network and a switching network, and a connection between the switching network and an access network;

receiving first user input to add an available multimedia program listing to a user collection of multimedia program listings;

displaying, on a display accessible to the processor, the user collection wherein the added multimedia program is listed;

receiving second user input to select a multimedia program listing from the displayed user collection for output by a network client; and sending a command to the network client to output a multimedia program corresponding to the selected multimedia program listing.

16. The computer readable medium of claim 15, wherein the operations include:

displaying, on the display, an indication of available multimedia programs accessible via the network, wherein at least a portion of the displayed indication is selected to provide the first user input.

17. The computer readable medium of claim 15, wherein the plurality of multimedia content sources includes at least one of: an electronic programming guide provided by the network, a video-on-demand program, a prerecorded program, a pay-per-view program, streaming Internet content, a scheduled program, and a program broadcast in real time.

18. The computer readable medium of claim 15, wherein the operations include:

causing the user collection, including the multimedia program listings, to be stored on a network server.

19. The computer readable medium of claim 18, wherein the operations include:

receiving third user input for selecting a stored user collection from a network server;

retrieving the selected user collection from the network server; and displaying, on the display, the retrieved user collection.

20. The computer readable medium of claim 19, wherein the operations include:

causing a plurality of multimedia programs corresponding to the retrieved user collection to be output at the network client in a predetermined sequence determined by sequence information included in the user collection.

* * * * *